US006867752B1

(12) United States Patent
Yamazaki et al.

(10) Patent No.: US 6,867,752 B1
(45) Date of Patent: Mar. 15, 2005

(54) PORTABLE INFORMATION PROCESSING SYSTEM

(75) Inventors: Shunpei Yamazaki, Tokyo (JP); Jun Koyama, Kanagawa (JP); Keisuke Hayashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/385,019

(22) Filed: Aug. 30, 1999

(30) Foreign Application Priority Data

Aug. 31, 1998 (JP) .......................... 10-244778
Mar. 29, 1999 (JP) .......................... 11-085533

(51) Int. Cl.$^7$ ................................................ G09G 5/00
(52) U.S. Cl. .............................. 345/8; 345/87; 345/92; 345/206; 349/111; 349/158
(58) Field of Search ...................... 345/8, 156, 7, 345/87, 90, 92, 206; 349/199, 116, 151, 153, 158; 257/59, 72

(56) References Cited

U.S. PATENT DOCUMENTS

| | | | | |
|---|---|---|---|---|
| 4,028,725 A | * | 6/1977 | Lewis | ................. 348/115 |
| 4,310,849 A | * | 1/1982 | Glass | ................. 348/53 |
| 5,151,688 A | * | 9/1992 | Tanaka et al. | ............. 345/104 |
| 5,446,564 A | * | 8/1995 | Mawatari et al. | ........... 349/116 |
| 5,559,358 A | * | 9/1996 | Burns et al. | ................. 257/431 |
| 5,583,335 A | * | 12/1996 | Spitzer et al. | .............. 250/221 |
| 5,594,569 A | | 1/1997 | Konuma et al. | |
| 5,661,604 A | | 8/1997 | Kuba | |
| 5,742,264 A | | 4/1998 | Inagaki et al. | |
| 5,751,260 A | | 5/1998 | Nappi et al. | |
| 5,790,009 A | | 8/1998 | Okada | |
| 5,920,401 A | * | 7/1999 | Street et al. | ............... 358/400 |
| 5,926,238 A | * | 7/1999 | Inoue et al. | ................. 349/61 |
| 5,991,085 A | * | 11/1999 | Rallison et al. | ............. 359/630 |
| 6,236,063 B1 | | 5/2001 | Yamazaki et al. | |
| 6,243,155 B1 | | 6/2001 | Zhang et al. | |
| 6,496,240 B1 | | 12/2002 | Zhang et al. | |

FOREIGN PATENT DOCUMENTS

WO    WO 95/21395    8/1995

OTHER PUBLICATIONS

"Characteristics and Driving Scheme of Polymer–Stabilized Monostable FLCD Exhibiting Fast Response Time and High Contrast Ratio with Gray–Scale Capability", H. Furue et al., 1998, SID, P–78.

"A Full–Color Thresholdless Antiferroelectric LCD Exhibiting Wide Viewing Angle with Fast Respponse Time", T. Yoshida et al., 1997, SID DIGEST, pp. 841–844.

"Thresholdless Antiferroelectricity in liquid crystals and its application to displays", S. Inui et al., 1996, J. Mater. Chem., 6(4), pp. 671–673.

Kobayashi et al., *24.3: The Application of a Bistable Device to Reflective Guest–Host LCDs*, 1997 SID International Symposium Digest of Technical Papers, May 13–15, 1997, pp. 405–408.

(List continued on next page.)

*Primary Examiner*—Dennis-Doon Chow
(74) *Attorney, Agent, or Firm*—Eric J. Robinson; Robinson Intellectual Property Law Office, P.C.

(57) ABSTRACT

To provide a portable information processing system with which downsizing and increase in display capacity may be realized. The portable information processing system according to the present invention displays, on an HMD (head mount display) worn by a user on his or her head, an image displayed on a display portion of a portable information terminal. The system employs wireless information transmitting/receiving means such as infrared-ray data communication or data communication by radio wave to transmit and receive information between the portable information terminal and the HMD.

28 Claims, 13 Drawing Sheets

OTHER PUBLICATIONS

Search Report, Application No. 99 11 7150, European Patent Office, Jul. 6, 2004.
European Search Report dated Oct. 14, 2004 for EP 99 11 7150.

T. Yoshida et al. "A Full–Color Thresholdless Antiferroelectric LCD Exhibiting Wide Viewing Angle with Fast Response Time," SID Digest, 1997, pp. 841–144.

* cited by examiner

PORTABLE INFORMATION PROCESSING SYSTEM

BACKGROUND OF THE INVENTION

1. Field of the Invention

The present invention to be disclosed in this specification relates to a portable information processing system with the use of a head mount display (HMD).

2. Description of the Related Art

Recently, portable information terminals such as mobile computers have become popular. Utilizing such portable information terminals including mobile computers, one may access the Internet, even when he/she is neither at home nor his/her office, to gain various information and send or receive E-mail. What lies behind the popularity of such portable information terminals including mobile computers is improvement in performance of an active matrix type liquid crystal display device.

An active matrix type liquid crystal display device has a circuit called an active matrix circuit comprising: several hundred thousands to several millions of pixel regions that are arranged in matrix; and a pixel TFT (thin film transistor) that is disposed at each of the pixel regions, and controls by means of a switching function of the TFT electric charges flowing into and out of a pixel electrode that is connected to a drain electrode of each pixel TFT.

Among the active matrix circuits, there is one composed of a thin film transistor that uses an amorphous silicon film formed on a glass substrate. Also, another thin film transistor that is made of a polycrystalline silicon film and uses a quartz substrate has lately been realized to be used in an active matrix type liquid crystal display device. In this case, a peripheral drive circuit for driving a pixel TFT may be formed on the same substrate on which the active matrix circuit is formed.

The portable information terminals including mobile computers should be, as they are so named, excellent in portability. In other words, the portable information terminals including mobile computers have to be small in size and light in weight. Limitation is accordingly put on the size of the active matrix type liquid crystal display device to be used in the portable information terminals including mobile computers. Employed in recent portable information terminals is an active matrix type liquid crystal display device of about size 3 to 4 which may display an image in compliance with the VGA (640×480 pixels) standard, which sometimes fail to display enough information with that size. It has lately been normal to use even in a personal computer for general people a CRT display of 20 inch or more which may display an image in compliance with the XGA (1024×768 pixels) or the SXGA (1280×1024 pixels) standard, and it may not beyond comprehension that the above-described active matrix type liquid crystal display device, that is of about size 3 to 4 and displays an image of low resolution, is now incapable of displaying enough information. Therefore, in order to display enough information, a mobile computer needs to be equipped with an active matrix type liquid crystal display device of large size and high resolution.

However, the portable information terminals including mobile computers are required to balance the portability and high performance, and it is difficult to simultaneously satisfy the demands for downsizing and for increase in display capacity, which are incompatible.

SUMMARY OF THE INVENTION

The present invention has been made in view of the problem above, and an object of the present invention is therefore to provide a novel portable information processing system that is to solve the aforementioned problem.

In the portable information processing system of the present invention, an image displayed on a display portion of a portable information terminal is displayed on an HMD (head mount display) worn by a user on his/her head. Information is sent and received between the portable information terminal and the HMD using wireless information transmitting/receiving means such as infrared-ray data communication or data communication by radio wave.

Hereinbelow, description will be made on the construction of the portable information processing system of the present invention.

According to a first aspect of the present invention, there is provided a portable information processing system comprising a display device worn by a user on his/her head, characterized in that:

the display device displays an image from a portable information terminal used by the user; and data is sent and received between the display device and the portable information terminal by infrared rays. With this portable information processing system, the object above may be attained.

According to a second aspect of the present invention, there is provided a portable information processing system comprising a display device worn by a user on his/her head, characterized in that:

the display device displays an image from a portable information terminal used by the user; and data is sent and received between the display device and the portable information terminal by radio wave. With this portable information processing system, the object above may be attained.

According to a third aspect of the present invention, there is provided a portable information processing system comprising a display device worn by a user on his/her head, characterized in that:

the display device displays an image from a portable information terminal used by the user;

picture recognizing means of the display device recognizes pictures of the user's eyes;

the recognized pictures of his/her eyes are used to calculate coordinates for the point of the visual of the user; and data is sent and received between the display device and the portable information terminal by infrared rays. With this portable information processing system, the object above may be attained.

According to a fourth aspect of the present invention, there is provided a portable information processing system comprising a display device worn by a user on his/her head, characterized in that:

the display device displays an image from a portable information terminal used by the user;

picture recognizing means of the display device recognizes pictures of the user's eyes;

the recognized pictures of his/her eyes are used to calculate coordinates for the point of the visual of the user; and data is sent and received between the display device and the portable information terminal by radio wave. With this portable information processing system, the object above may be attained.

The picture recognizing means may be an image sensor. The picture recognizing means may be a CCD camera.

DESCRIPTION OF THE PREFERRED EMBODIMENTS

Figure 1:
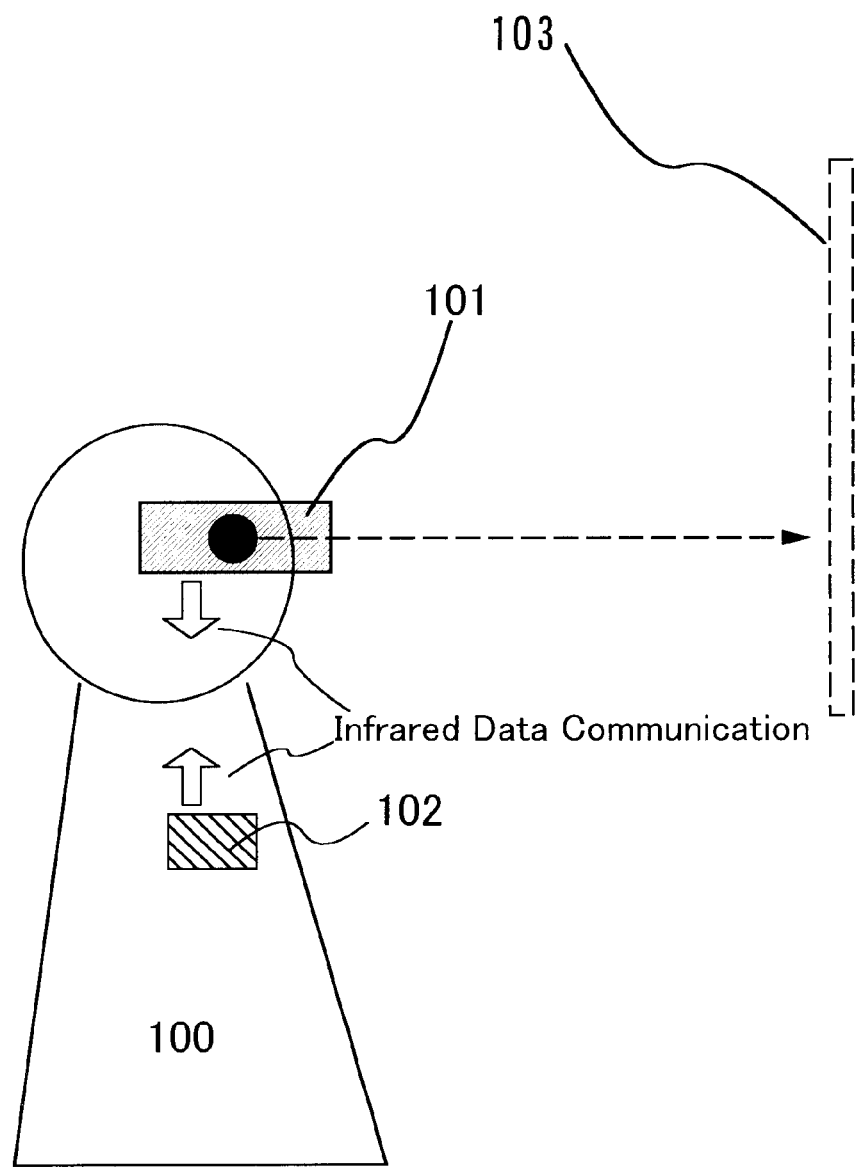
FIG. 1 is a schematic diagram showing the construction of a portable information processing system according to the present invention.

FIG. 1 is a schematic diagram showing the construction of a portable information processing system according to the present invention.

In FIG. 1, reference numeral 100 denotes a user; 101, a display device (HMD: head mount display) worn by the user; and 102, a portable information terminal. In each of the display device 101 and the portable information terminal 102, an infrared-ray data transmitting/receiving module is incorporated as information transmitting/receiving means, which can send and receive data by infrared rays. Reference numeral 103 denotes a virtual display screen that represents a screen the user actually observes (recognizes) when wearing the display device.

Figure 2:
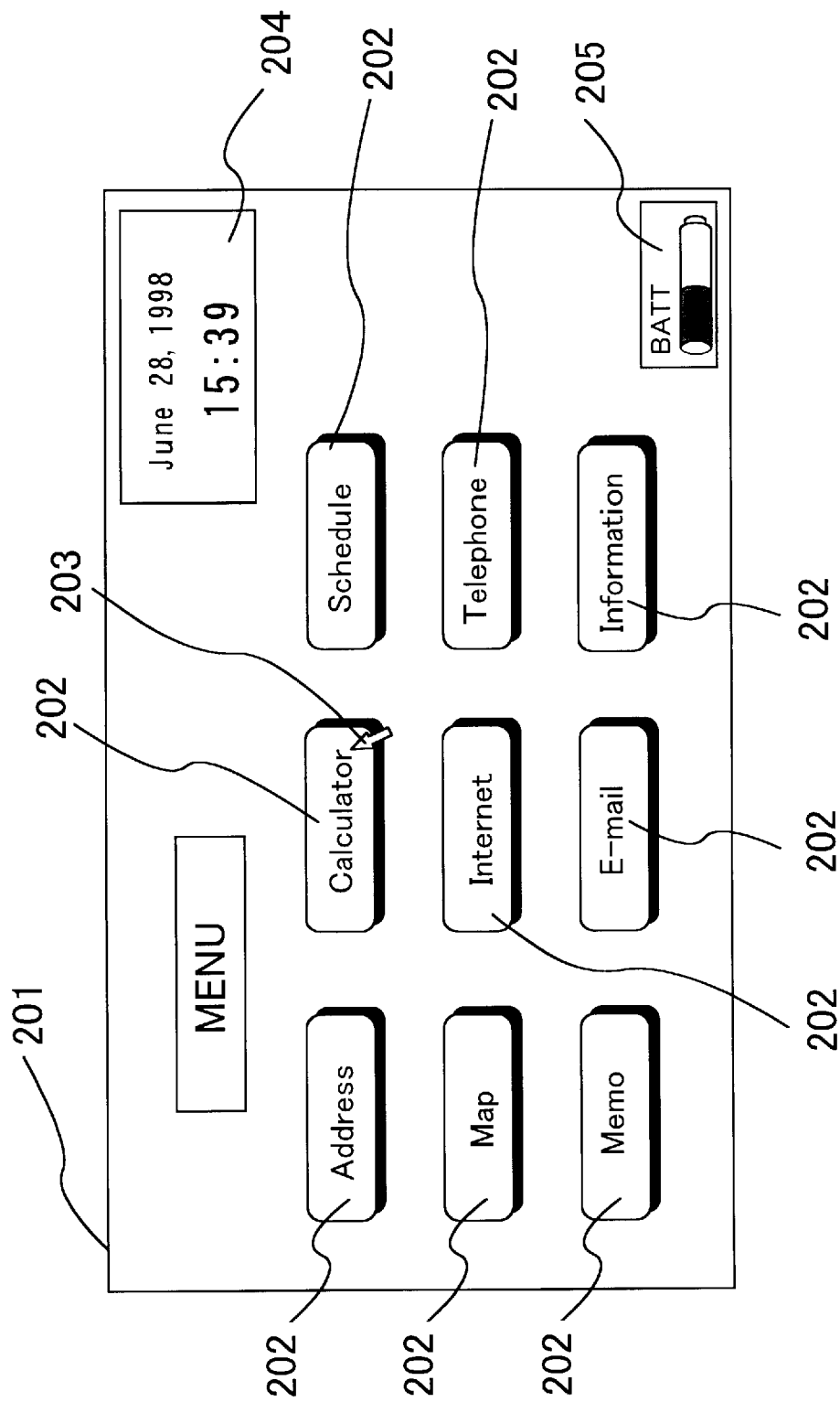
FIG. 2 is a view showing a virtual display screen of a portable information processing system according to the present invention.

FIG. 2 shows an example of an image to be displayed on a virtual display screen 201 of the portable information processing system according to the present invention. Reference numeral 202 denotes icons, out of which a user selects one by operating a pointer 203 to gain access to various kinds of information. How to operate the pointer 203 will be explained in Embodiments to be described later. A variety of informations are displayed on sections denoted by 204 and 205. In FIG. 2, an image displayed on a screen of the portable information terminal 102 is displayed on the entire area of the virtual display screen 201. However, the image displayed on the screen of the portable information terminal 102 may be displayed on a part of the virtual display screen 201. Alternatively, a plurality of windows for displaying information may be simultaneously displayed.

Figure 3:
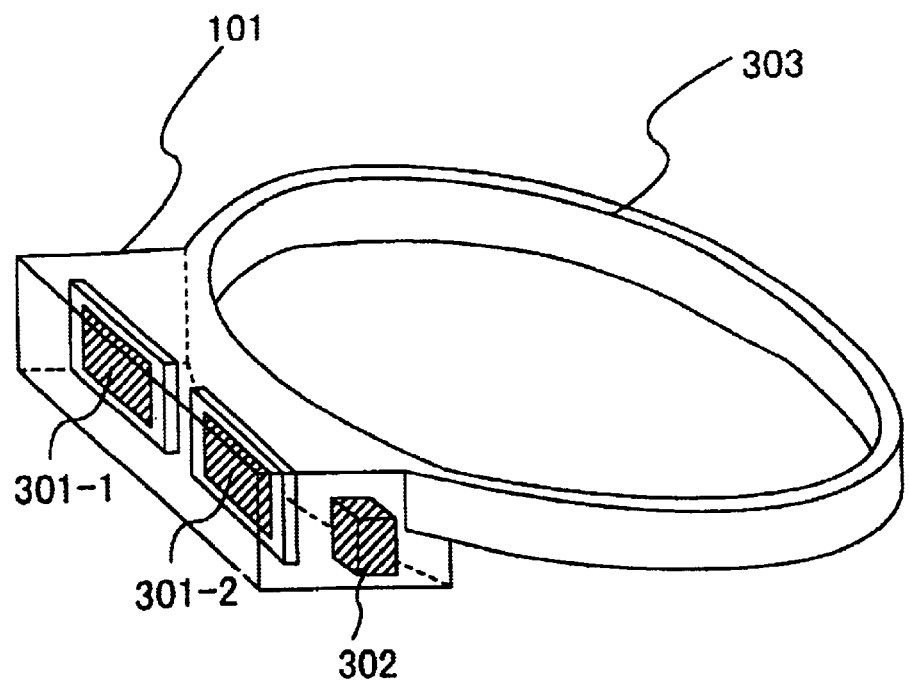
FIG. 3 is a schematic diagram showing the construction of a display device in a portable information processing system according to the present invention.

Now description will be made with reference to FIG. 3 on the general construction of the display device 101 of the portable information processing system according to the present invention. FIG. 3 shows a perspective view of the display device 101 when seen obliquely. Reference numerals 301-1 and 301-2 denote liquid crystal panels, which are transmission type liquid crystal panels of active matrix type. The liquid crystal panels 301 display on the basis of a video signal sent from the portable information terminal 102. Reference numeral 302 denotes an infrared-ray data transmitting/receiving module that is a module for transmitting and receiving infrared data to and from the portable information terminal 102.

Figure 4:
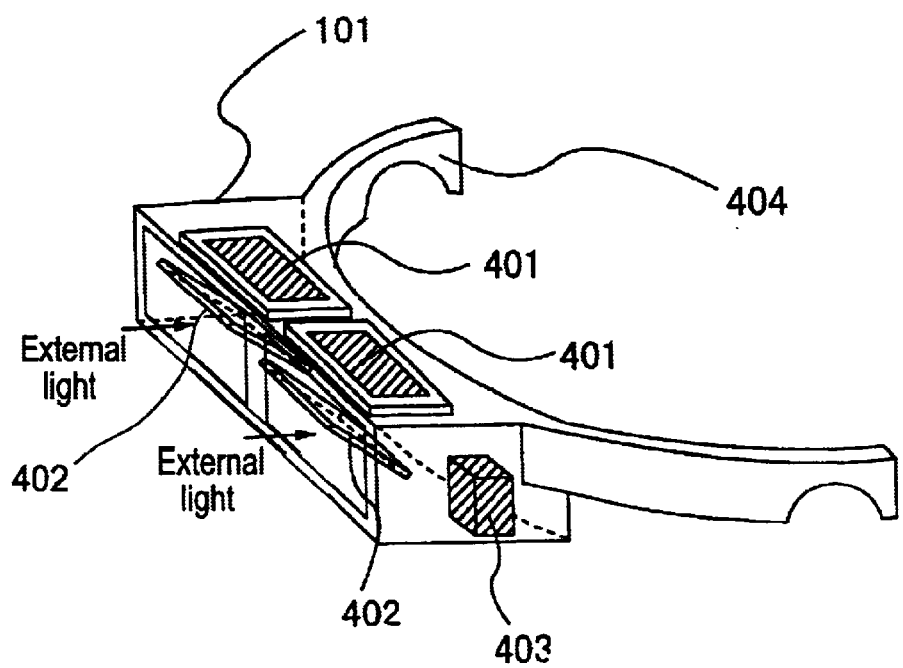
FIG. 4 is a schematic diagram showing the construction of a display device in a portable information processing system according to the present invention.

FIG. 4 shows another display device 101 of the portable information processing system according to the present invention, which has different construction. In FIG. 4, reference numerals 401-1 and 401-2 denote liquid crystal panels, which are transmission type liquid crystal panels of active matrix type. Denoted by reference numeral 402 are mirrors. A user observes an image on the liquid crystal panels 401, which is reflected on the half-mirrors 402. Incidentally, reflection type liquid crystal panels of active matrix type may be employed for the liquid crystal panels 401-1 and 401-2. The display device may be provided with half-mirrors, that replace the mirrors 402, and an optical shutter in front of the liquid crystal panels 401-1 and 401-2 against the external light incident upon the display device, so that the observation by a user of an image on the liquid crystal panels 401-1 and 401-2 may be controlled. In this case, to adjust intensity of light transmitted through this optical shutter enables the user to choose from observation of the outside view, observation of an image from the portable information terminal, and observation of both the outside view and image being displayed.

Though used in the portable information processing systems shown in FIGS. 3 and 4 are two liquid crystal panels in correspondence with both the left and right eyes of a user, a portable information processing system may also be realized using a single liquid crystal panel with which a user may observe with only one of his or her eyes.

With Embodiments hereunder, description will now be given on modes for carrying out a portable information processing system according to the present invention. However, it should be reminded that the portable information processing system of the present invention is not limited to those Embodiments below.

Embodiment 1

Figure 5:
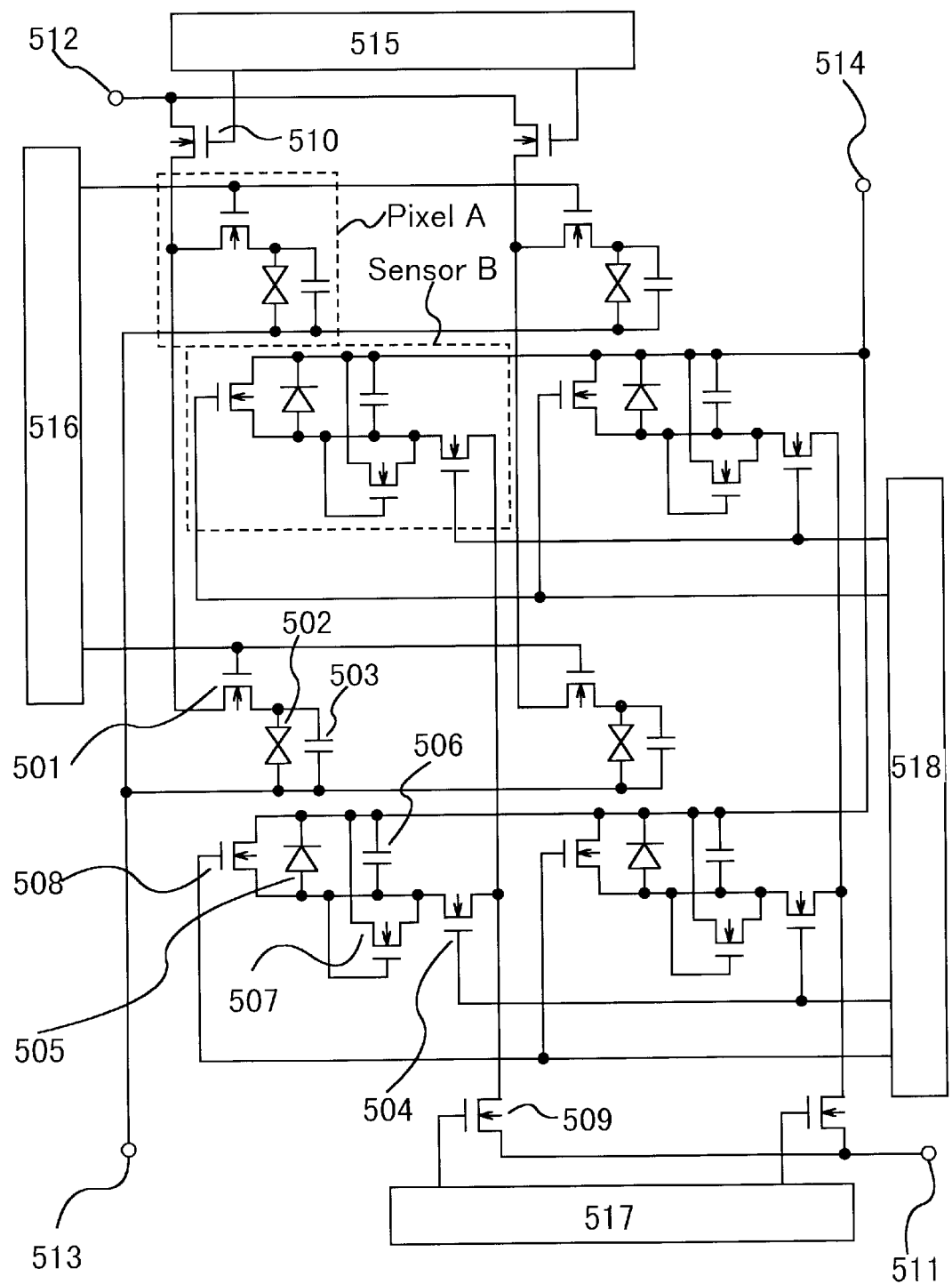
FIG. 5 is a structural view of a circuit for a liquid crystal panel that is incorporated in a display device for use in a portable information processing system according to the present invention.

In this embodiment, some mode for carrying out a portable information processing system of the present invention will be described. General construction of the portable information processing system in this embodiment is the same as one shown in FIG. 3. FIG. 5 shows a schematic structural view of a circuit on an active matrix substrate of a liquid crystal panel for use in a display device of the portable information processing system according to this embodiment.

The liquid crystal panel for use in a display device of the portable information processing system according to this embodiment has display means for displaying an image and picture recognizing means (sensor means) for detecting the motion of user's line of sight. In FIG. 5, a liquid crystal panel with 2-by-2 pixels is shown for convenience's sake in explanation. Every pixel of the liquid crystal panel includes a pixel portion A and a sensor portion B. Employment of the arrangement of this embodiment realizes a liquid crystal panel of about 0.9 inch having pixels as many as it meets the XGA standard.

The pixel portion A has a pixel TFT 501, liquid crystal 502 and an auxiliary capacitance 503. The liquid crystal 502 is held between an active matrix substrate and an opposite substrate. Based on a timing signal sent from a driver circuit on the pixel source signal line side 515, an analog switch 510 executes sampling of a video signal inputted from an image input signal line 512, and supplies the video signal to the pixel TFT. Reference numeral 516 denotes a driver circuit on the pixel gate signal line side, which supplies a scan signal to the pixel TFT.

The sensor portion B has a sensor TFT 504, a photodiode 505, an auxiliary capacitance 506, a signal amplifying TFT 507 and a reset TFT. With a timing signal sent from a sensor horizontal drive circuit 517, an analog switch 509 outputs to a sensor output signal line 511 a signal sent from the sensor TFT. Denoted by reference numerals 513 and 514 are fixed electric potential lines. Also, a scanning pulse is sent from a sensor vertical drive circuit 518.

The liquid crystal panel for use in the display device of the portable information processing system according to this embodiment comprises display means for displaying to a user an image from a portable information terminal and picture recognizing means (sensor means) for measuring the motion of user's line of sight. Here, description is given on a function of the sensor means for measuring the motion of user's line of sight and for transmitting information about motion of a pointer to the portable information terminal.

Figure 6:
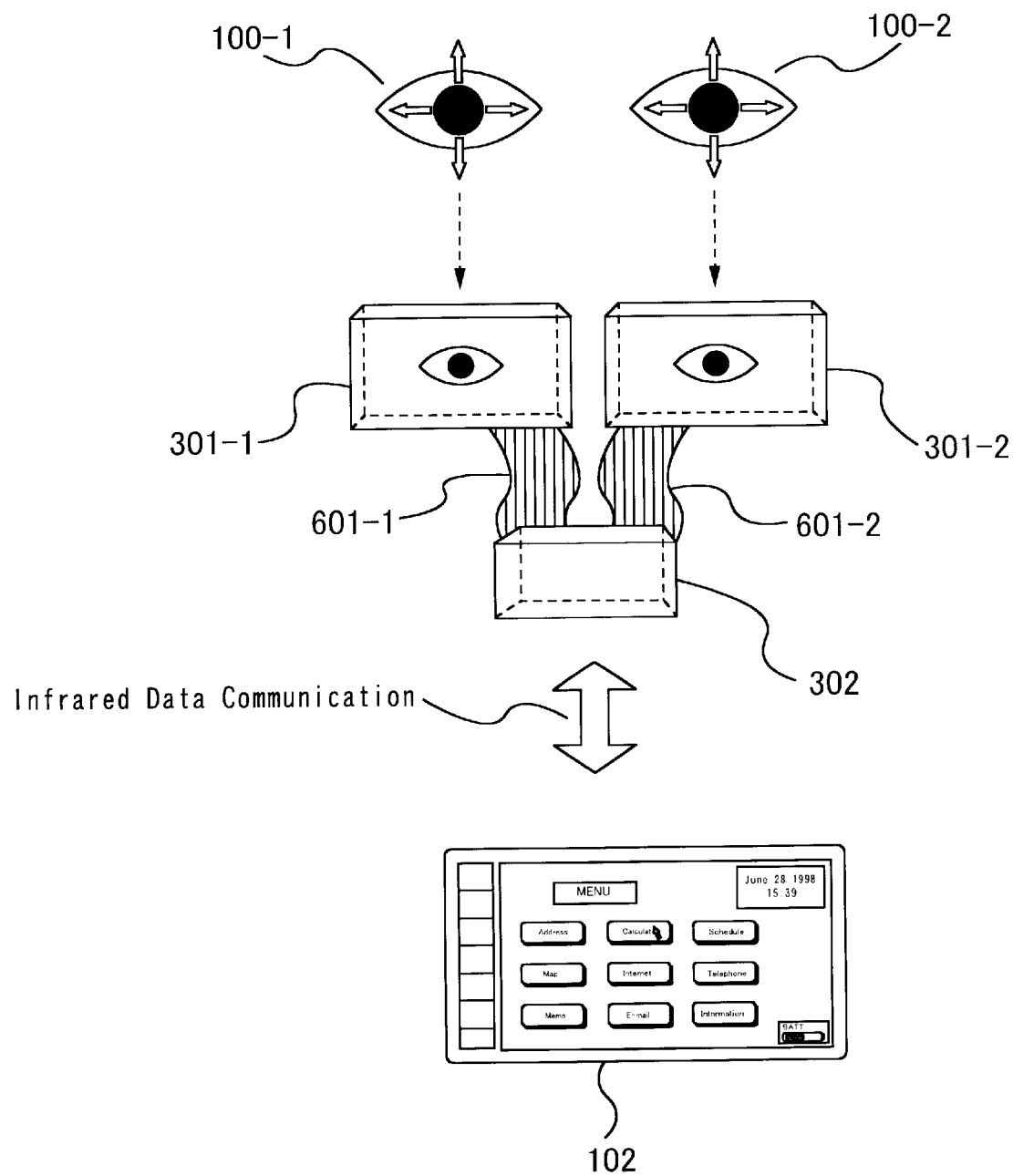
FIG. 6 is a diagram illustrating how to operate a pointer of a portable information terminal in a portable information processing system of the present invention, which is used in Embodiment 1.
Figure 7:
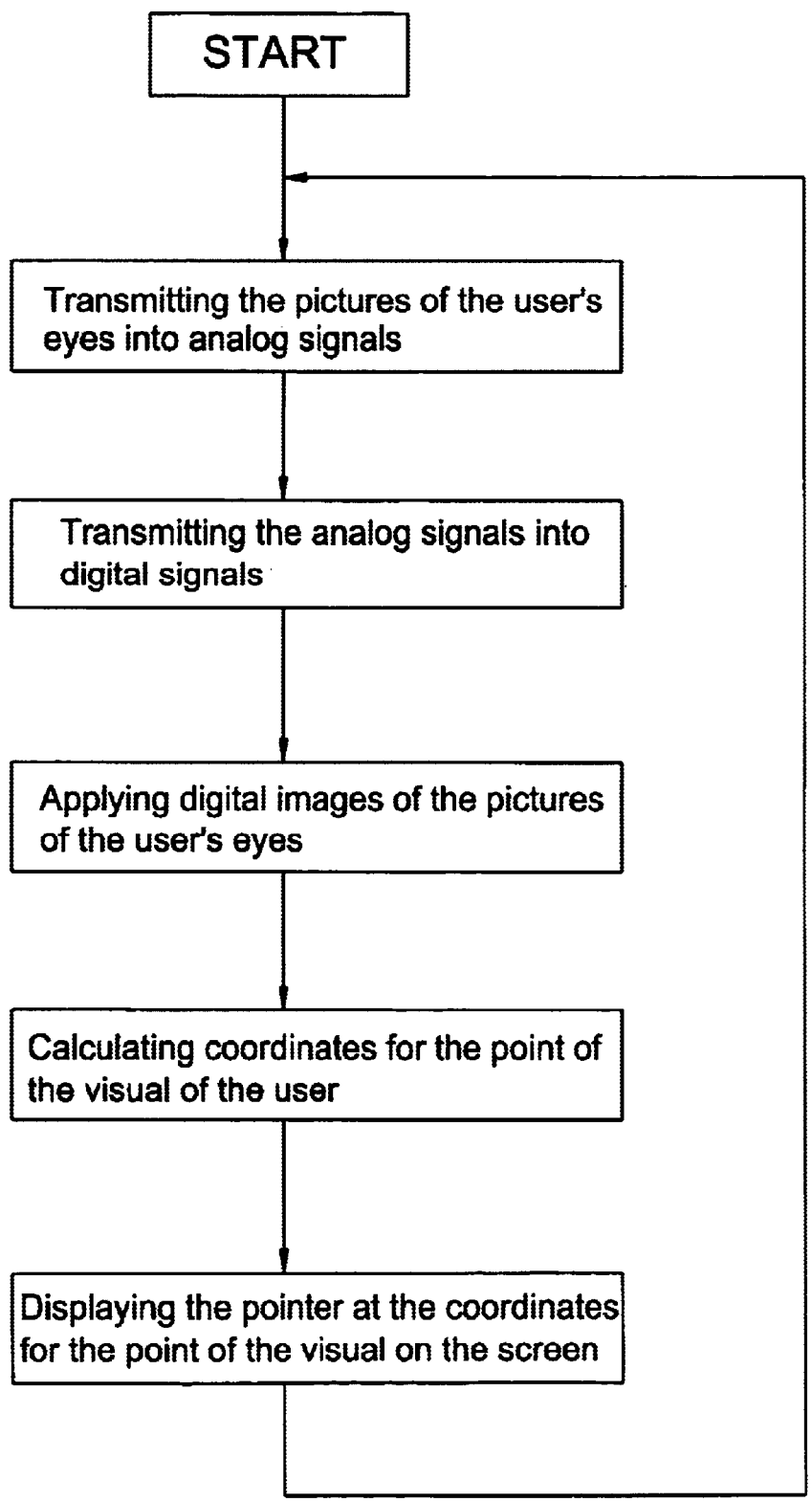
FIG. 7 is a chart illustrating how to operate the pointer of the portable information terminal in the portable information processing system of the present invention, which is used in Embodiment 1.

Reference is made to FIG. 6. FIG. 6 shows the liquid crystal panels used in this embodiment, which are under observational work for the motion of user's line of sight. Reference numeral 100-1 denotes one of eyes of a user. Reference numerals 601-1 and 601-2 denote FPCs (Flexible Print Circuits) for connecting liquid crystal panels 301 to an infrared-ray data transmitting/receiving module. The picture of the user's eye 100-1 is translated into signals by the sensor means of the liquid crystal panels 301-1 and 301-2 to determine coordinates for the point of the visual of a user 100 on a virtual display screen 104 (that is, the liquid crystal panels). Turning hereat to FIG. 7, the course to determine coordinates for the point of the visual of the user 100 will be described (in flow chart).

FIG. 7 shows a flow chart illustrating the course to determine coordinates for the point of the visual of the user 100. First, the sensor means of the liquid crystal panels translate the pictures of the user's eyes into analog signals. The analog signals are then converted into digital ones to apply an image processing thereto, eventually obtaining recognition of the user's eyes. The obtained pictures of the left and right eyes are then used to calculate coordinates for the point of the visual of the user. Subsequently, the pointer is displayed at the coordinates for the point of the visual on the screen of the portable information terminal. Quick blink of eyes or the like is identified by the system as an instruction to click an item or a section selected with the pointer. Incidentally, steps up to calculation of coordinates for the point of the visual may be conducted by a peripheral circuit of the liquid crystal panel. The steps up to calculation of coordinates for the point of the visual may be conducted instead by a circuit incorporated in the infrared-ray data transmitting/receiving module. Also, the course may be modified such that the sensor means merely translate the pictures of the user's eyes into analog signals, and the portable information terminal receives this data to execute subsequent calculation. Each of the signal processing steps shown in the flow chart of FIG. 7 may be conducted by any of the liquid crystal panels, circuits incorporated in the portable information processing system, the infrared-ray data transmitting/receiving modules and the portable information terminal.

Figure 8:
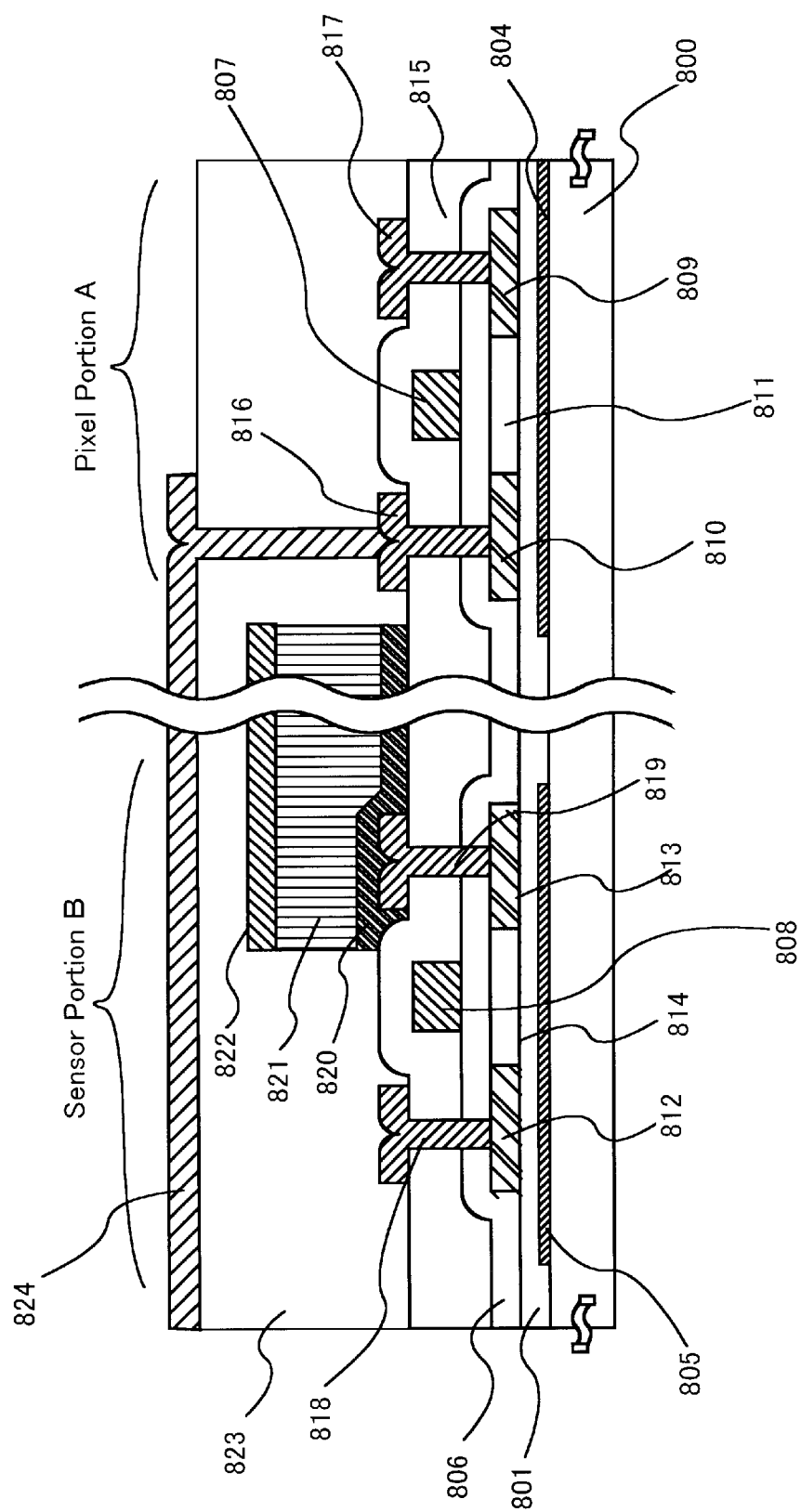
FIG. 8 is a sectional view showing a liquid crystal panel incorporated in a display device for use in a portable information processing system according to the present invention.

Now description will be made with reference to FIG. 8 on the construction of the liquid crystal panel for use in the portable information processing system according to this embodiment. Shown in FIG. 8 in section is an active matrix substrate of the liquid crystal panel for use in the display device of the portable information processing system according to this embodiment. The active matrix substrate of the liquid crystal panel used in this embodiment comprises, as shown in FIG. 8, pixels each consisting of the pixel portion A and the sensor portion B. A pixel TFT and a sensor TFT make appearance in FIG. 8. The reset TFT, the sensor TFT and the signal amplifying TFT are omitted from FIG. 8 for convenience's sake in explanation.

A light shielding film 804 is provided on a substrate 800 to gain the structure in which the pixel TFT is protected against light incident from the back surface. The sensor TFT on the sensor portion B side is provided with a light shielding film 805. Still another light shielding film (not shown) may be arranged at the reset TFT or the signal amplifying TFT (both of which are not shown) of the sensor portion B. Those light shielding films may be formed directly on the back surface of the substrate 800.

After a base film 801 is formed on those light shielding films 804 and 805, fabricated at once are: the pixel TFT of the pixel portion A; the sensor TFT, the signal amplifying TFT and the reset TFT of the sensor portion B; and TFTs for constituting the driver circuit and the peripheral circuit. The back surface of the substrate 800 means here one of the substrate surfaces, on which those TFTs are not formed. Those TFTs may be top gate type TFTs or bottom gate type TFTs. FIG. 8 illustrates taking an example of the top gate type TFT.

A lower electrode 820 that is connected to an electrode 819 of the sensor TFT is then provided. This lower electrode 820 serves as a lower electrode of a photodiode (photoelectric conversion element), and is formed in a pixel region other than an area above the pixel TFT. A photo-electric conversion layer 821 is provided on this lower electrode 820, and an upper electrode 822 is further formed thereon to complete the photodiode. Incidentally, a transparent electrode is used for the upper electrode 822.

On the other hand, the pixel TFT of the pixel portion is provided with a transparent pixel electrode 824 for connecting to an electrode 816. This transparent pixel electrode may cover the sensor portion B and a wiring. In the case that the transparent pixel electrode covers the wiring, a capacitance is formed using as a dielectric an insulating film present between the wiring and the transparent pixel electrode.

The process of manufacturing the liquid crystal panel for use in the display device of the portable information processing system according to this embodiment is in general the same as a conventional manufacturing process of a liquid crystal panel, except that a step of fabricating photodiode is added. The liquid crystal panel of this embodiment is therefore possible to use a conventional manufacturing process, and the production thereof is easy and inexpensive.

Described below is a process of manufacturing the liquid crystal panel for use in the display device of the portable information processing system according to this embodiment.

Reference is made to FIGS. 9A to 9D. Firstly, the base film 801 is formed on the entire surface of the transparent substrate 800. A substrate usable as the transparent substrate 800 is a glass substrate or a quartz substrate having transparency. As the base film 801, a silicon oxide film with a thickness of 150 nm is formed by the plasma CVD. In this embodiment, prior to the step of forming this base film, the light shielding film 804 for protecting the pixel TFT against light from the back surface and the light shielding film 805 for protecting the sensor TFT against light from the back surface are provided.

Next, an amorphous silicon film is formed by the plasma CVD by 30 to 100 nm, preferably 30 nm, in thickness. The film is irradiated with excimer laser light to form a polycrystalline silicon film. Examples of a crystallizing method of the amorphous silicon film include a thermal crystallizing method called SPC, the RTA utilizing irradiation of infrared rays and a method in which thermal crystallization and laser annealing are together used.

Figure 9A:
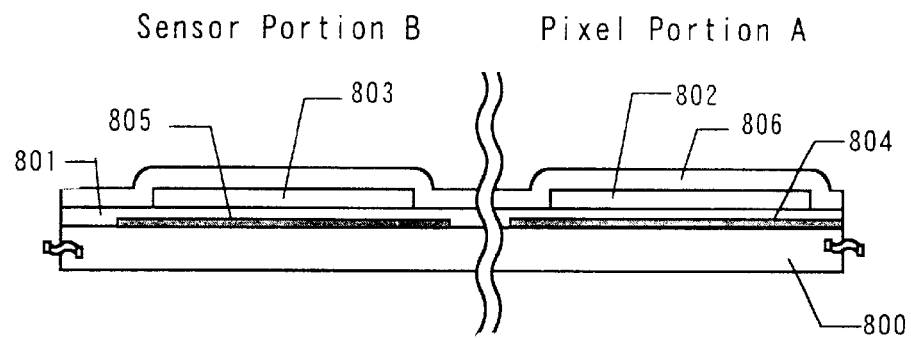
FIGS. 9A to 9D are views showing a process of manufacturing a liquid crystal panel incorporated in a display device for use in a portable information processing system according to the present invention.

Subsequly, the polycrystalline silicon film is patterned to form: a semiconductor layer 802 of an island-like shape which constitutes a source region, a drain region and a channel formation region of the pixel TFT; and a semiconductor layer 803 of an island-like shape which constitutes a source region, a drain region and a channel formation region of the sensor TFT. A gate insulating film 806 is then formed to cover those semiconductor layers. The gate insulating film 806 is formed with a thickness of 100 nm by the plasma CVD using as material gas silane ($SiH_4$) and $N_2O$ (FIG. 9A).

A conductive film is next formed. Though used here as a material for the conductive film is aluminum, a film containing as its main ingredient titanium or silicon, or a laminated film of those may be employed. In this embodiment, an aluminum film with a thickness of 200 to 500 nm, typically 300 nm, is formed by the sputtering. To suppress the occurrence of hillock and whisker, scandium (Sc), titanium (Ti) or yttrium (Y) is contained in 0.04 to 1.0% by weight in the aluminum film.

A resist mask is then formed and the aluminum film is patterned to form an electrode pattern, thereby forming a gate electrode 807 of the pixel TFT and a gate electrode 808 of the sensor TFT.

Figure 9B:
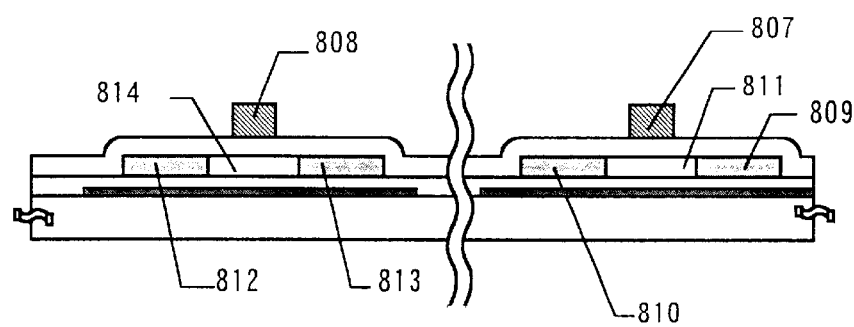

An offset structure is subsequently formed by a known method. Further, an LDD structure may be formed by a known method. Thus formed are impurity regions (source and drain regions) 809, 810, 812 and 813, and channel formation regions 811 and 814 (FIG. 9B). In FIGS. 9A to 9D, only the sensor TFT and the pixel TFT which are N channel type TFTs are shown for convenience's sake in explanation. However, P channel type TFTs are also fabricated. Appropriately used impurity element for the N channel type is P (phosphorus) or As (arsenic), and the element for the P channel type is B (boron) or Ga (gallium).

Then, a first interlayer insulating film 815 is formed to form contact holes reaching the impurity regions 809, 810, 812 and 813, respectively. A metal film is thereafter formed and patterned to form electrodes 816 to 819. At this time, a wiring for connecting a plurality of TFTs with one another is simultaneously formed.

Formed as the first interlayer insulating film 815 in this embodiment is a silicon nitride film having a thickness of 500 nm. Other than the silicon nitride film, a silicon oxide film or a silicon nitride oxide film may be used for the first interlayer insulating film 815. A multi-layer film including those insulating films may be alternatively used.

Figure 9C:
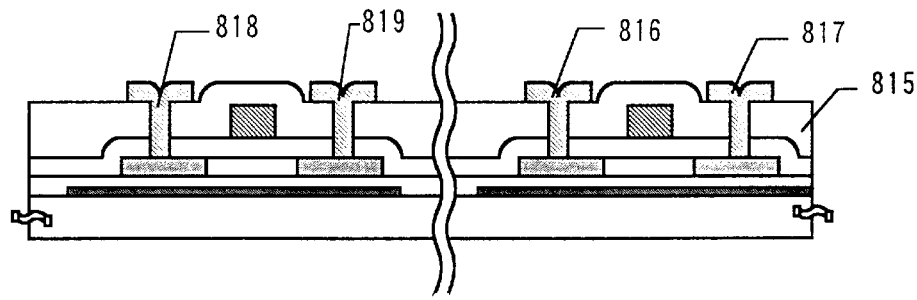
Figure 9D:
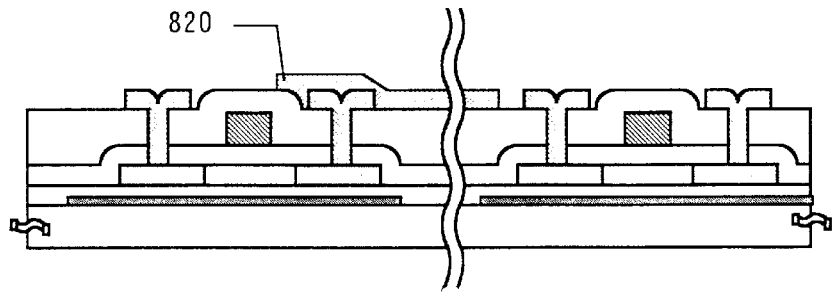

As the metal film that serves as a starting film of the electrodes and the wiring, in this embodiment, a laminated film consisting of a titanium film, an aluminum film and another titanium film is formed through the sputtering. Those films have a thickness of 100 nm, 300 nm and 100 nm, respectively. Through the process above, the pixel TFT and the sensor TFT are completed at the same time (FIG. 9C).

Subsequently, a metal film is formed so as to come in contact with the first interlayer insulating film 815 and the drain electrode 819 of the sensor TFT. The formed metal film is patterned to form the lower electrodes 820 of the photo-electric conversion element. Though used for this metal film in this embodiment is an aluminum film formed through the sputtering, other metal films may be used. For example, a laminated film comprising a titanium film, an aluminum film and another titanium film may be employed.

Figure 10A:
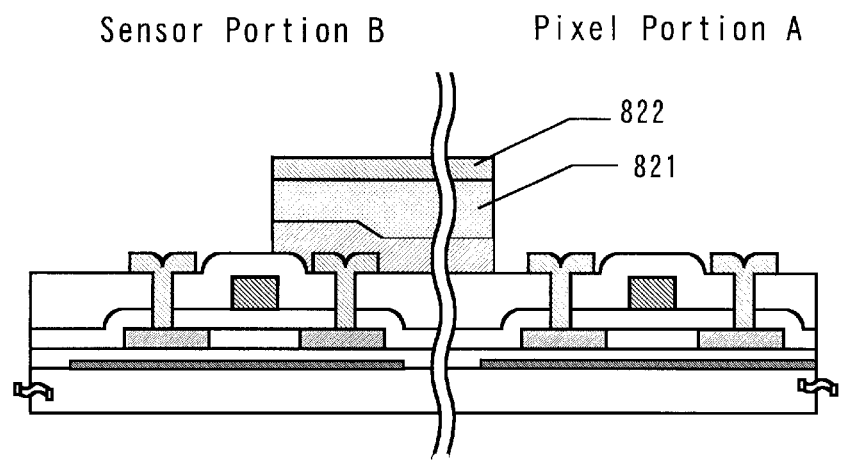
FIGS. 10A to 10C are views showing the process of manufacturing the liquid crystal panel incorporated in the display device for use in the portable information processing system according to the present invention.
Figure 10B:
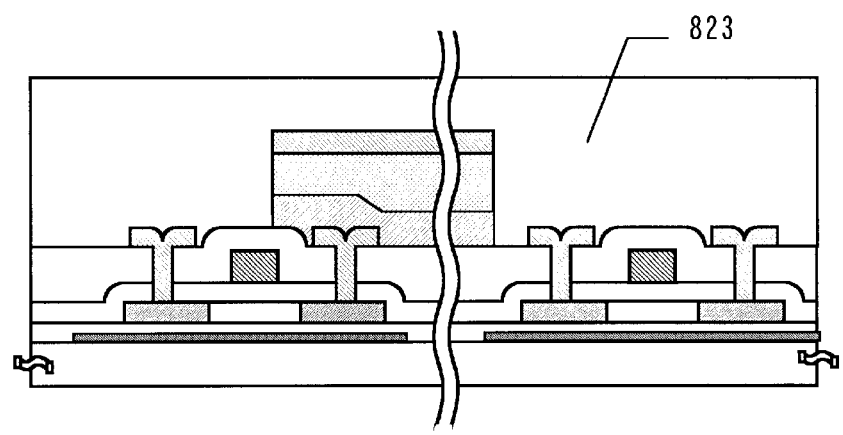
Figure 10C:
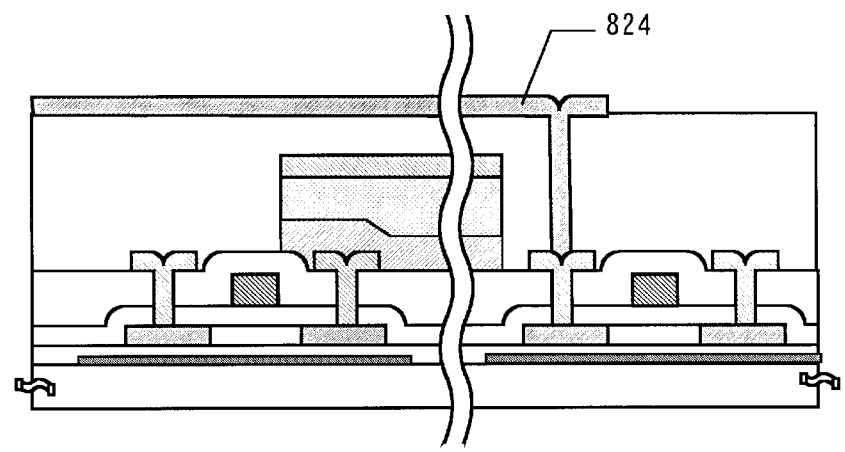

Reference is made to FIGS. 10A to 10C. On the entire surface of the substrate, an amorphous silicon film containing hydrogen (hereinafter, referred to as a—Si:H film) which functions as a photo-electric conversion layer is next formed and patterned to produce the photo-electric conversion layer 821 (FIG. 10A).

A transparent conductive film is subsequently formed on the entire surface of the substrate. Formed in this embodiment as the transparent conductive film through the sputtering is an ITO film having a thickness of 200 nm. The transparent conductive film is patterned to form the upper electrode 822 (FIG. 10A).

Then, a second interlayer insulating film 823 is formed. A resin film such as polyimide, polyamide, polyimideamide or acryl is preferably formed as an insulating coat that constitutes the second interlayer insulating film, obtaining a flat surface. Alternatively, the second interlayer insulating film may have lamination structure the upper layer of which is the resin film above and the lower layer of which is a single layer or a multi-layered film made of an inorganic insulating material such as silicon oxide, silicon nitride or silicon nitride oxide. In this embodiment, a polyimide film with a thickness of 0.7 µm is formed as the insulating coat on the entire surface of the substrate (FIG. 10B).

Further, a contact hole reaching the drain electrode 816 is formed in the second interlayer insulating film 823. A transparent conductive film is again formed on the entire surface of the substrate, and is patterned to form the transparent pixel electrode 824 connected to the pixel TFT.

Through the steps above, the active matrix substrate is completed.

This active matrix substrate is bonded to the opposite substrate with a sealant, and liquid crystal is injected therebetween to finish the liquid crystal panel. This opposite substrate is comprised of a transparent conductive film and an orientated film which are formed on a transparent substrate. The opposite substrate may be provided with, in addition to those films, a black mask, a color filter and the like, if necessary.

Embodiment 2

In this embodiment, data is communicated with radio wave between a display device (HMD) and a portable information terminal in a portable information processing system of the present invention.

Figure 11:
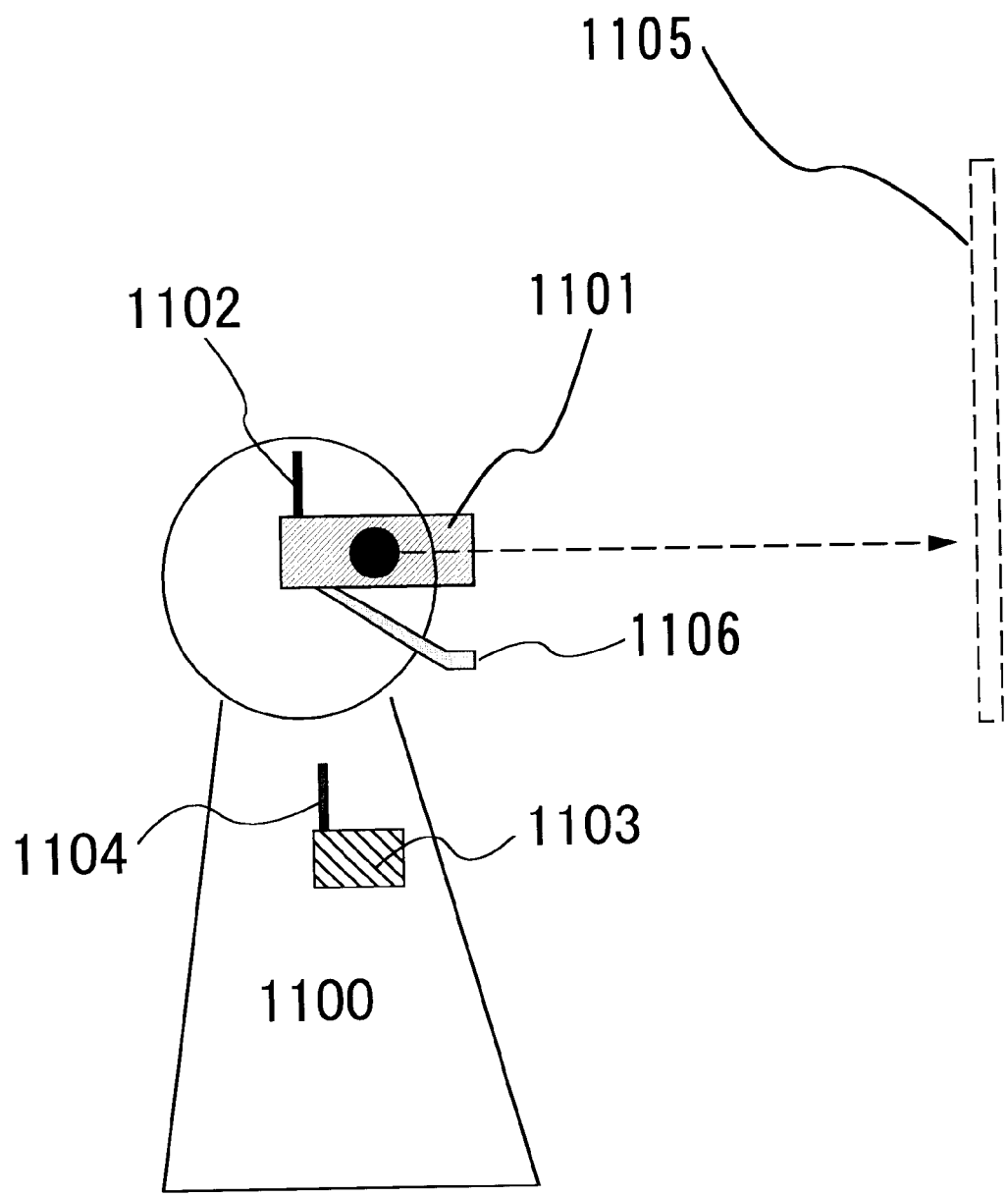
FIG. 11 is a schematic diagram showing the construction of a portable information processing system according to the present invention.

Reference is made to FIG. 11. FIG. 11 is a schematic diagram showing the construction of the portable information processing system-according to this embodiment. Reference numeral 1101 denotes a display device (HMD) that is the same as one shown in FIG. 4. Difference between the two is that the display device in this embodiment is equipped with an antenna 1102 and a microphone 1106, which are provided to allow a user 1100 to operate the portable information terminal with his or her voice. Reference numeral 1103 denotes the portable information terminal and 1104 denotes an antenna provided on the portable information terminal. Denoted by reference numeral 1105 is a virtual display screen, and it represents a screen, which the user 1100 actually observes when wearing the display device. Incidentally, the display device may be the same one as used in FIG. 3.

Figure 12:
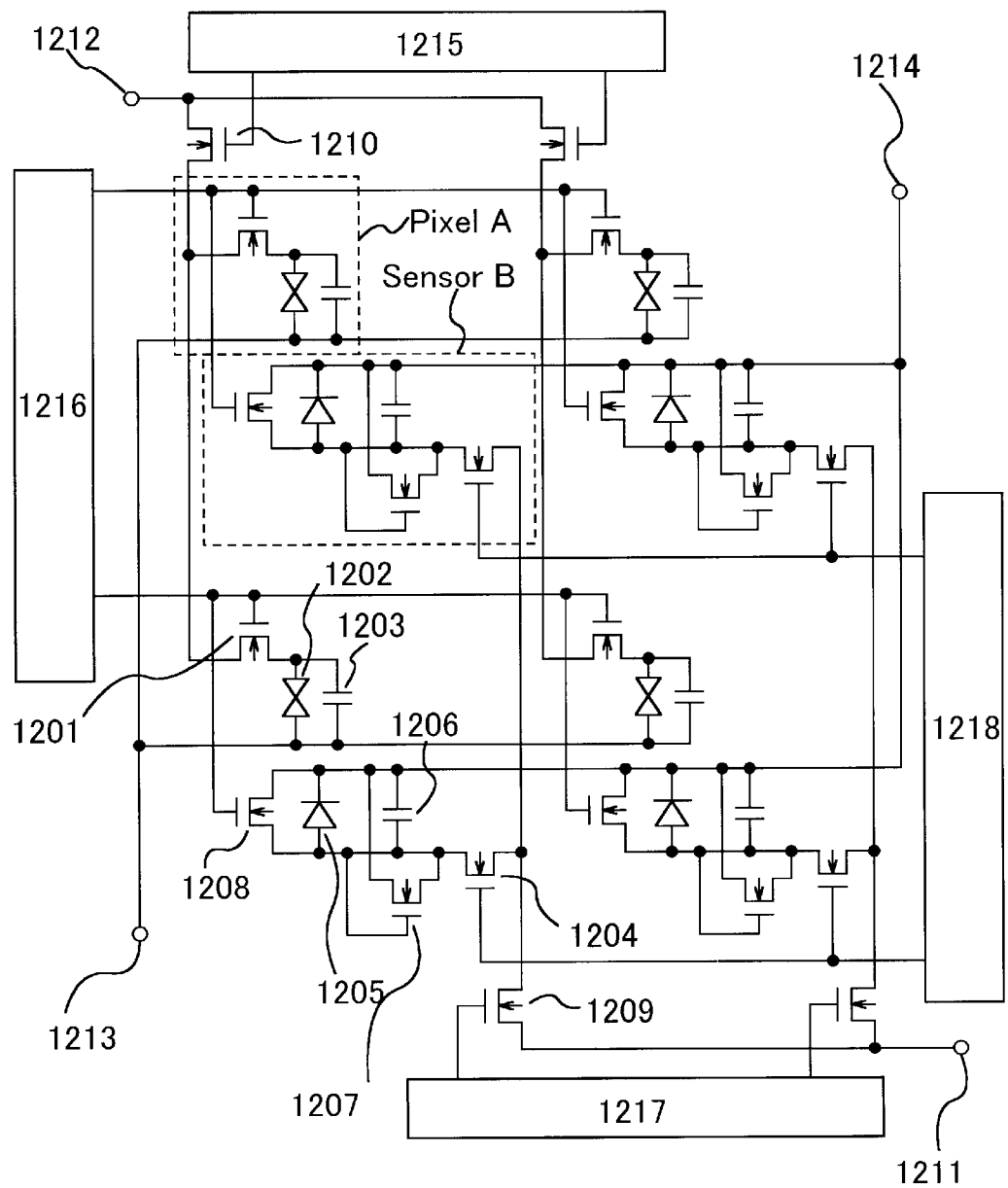
FIG. 12 is a structural view of a circuit for a liquid crystal panel that is incorporated in a display device for use in a portable information processing system according to the present invention.

FIG. 12 is a circuit diagram of a liquid crystal panel for use in the portable information processing system of this embodiment. Reference numeral 1201 denotes a pixel TFT; 1202, liquid crystal; 1203, an auxiliary capacitance; 1204, a sensor TFT; 1205, a photodiode PD; 1206, another auxiliary capacitance; 1207, a signal amplifying TFT; 1208, a reset TFT; and 1209 and 1210, analog switches. 1201 and 1203 form a pixel portion A, and 1204, 1205, 1206, 1207 and 1208 form a sensor portion B. Reference numeral 1211 denotes a sensor output signal line and 1212 denotes an image input signal line. Denoted by reference numerals 1213 and 1214 are fixed electric potential lines. Reference numeral 1215 denotes a driver circuit on the pixel source signal line side; 1216, a driver circuit on the pixel gate signal line side; 1217, a sensor horizontal drive circuit; and 1218, a sensor vertical drive circuit.

The liquid crystal panel for use in the portable information processing system of this embodiment uses an analog driver circuit that handles an analog video signal. However, the present invention is not limited thereto. Namely, it also is possible to use a digital driver circuit equipped with a D/A conversion circuit that handles a digital video signal.

The liquid crystal panel used in the display device of this embodiment may be the same one as used in Embodiment 1.

Embodiment 3

A portable information processing system in this embodiment employs a CCD camera to recognize the pictures of user's eyes, which are used to determine coordinate position for a pointer of a portable information processing terminal.

Figure 13:
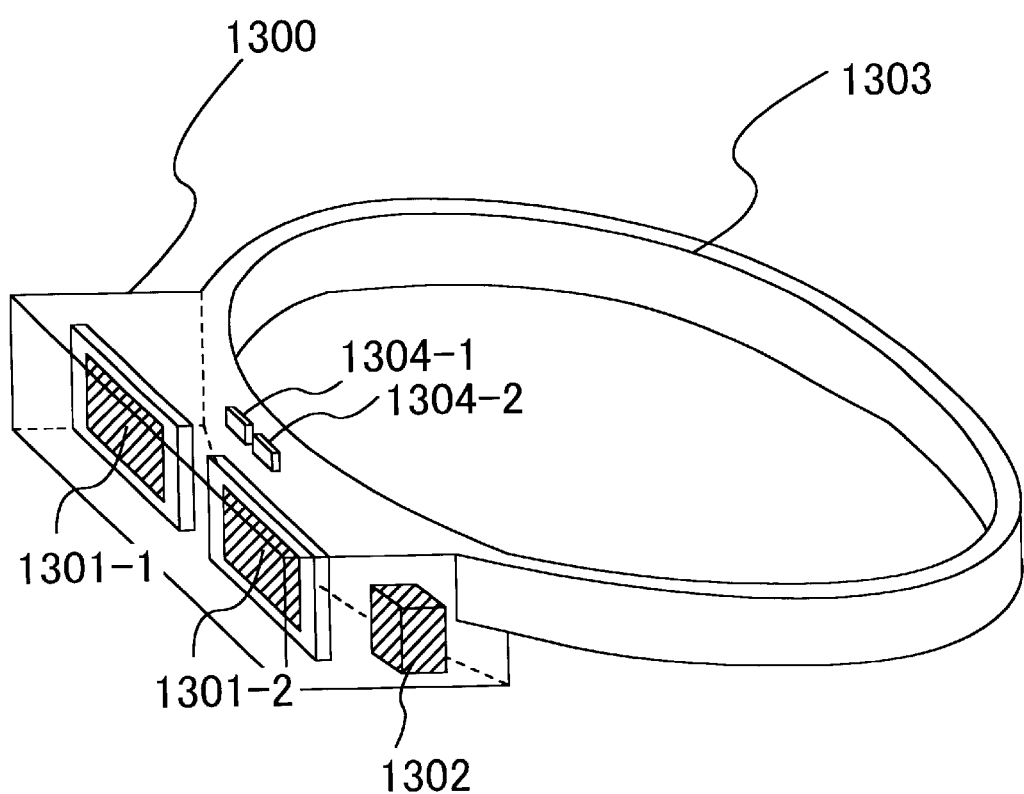
FIG. 13 is a schematic diagram showing the construction of a display device in a portable information processing system according to the present invention.

Reference is made to FIG. 13. FIG. 13 is a schematic diagram showing the construction of a display device in the portable information processing system of this embodiment. Reference numeral 1300 denotes the main body of the display device; 1301-1 and 1301-2, liquid crystal panels; 1302, an infrared-ray data transmitting/receiving module; 1303, a band portion; and 1304, a CCD.

The liquid crystal panel for use in the display device of the portable information processing system according to this embodiment is a liquid crystal panel having a display function only, and the CCD is used to recognize the pictures of user's eyes. The flow chart described in Embodiment 1 and relating to recognition of the pictures of the user's eyes to move the pointer of the portable information terminal may be applied to this embodiment.

Embodiment 4

In order to move the pointer of the portable information terminal, in Embodiments 1 to 3 described above, the pictures of the user's eyes are recognized to determine coordinates for the pointer. In this embodiment, however, a mouse or a device equivalent thereto which is connected to the portable information terminal or the display device is given a function of moving the pointer of the portable information terminal. This function may be applied to any of Embodiments 1 to 3 above. Instead of the mouse or the device equivalent thereto which is directly connected, wireless information transmitting/receiving means such as infrared-ray data communication may be used to transmit and receive data.

The system may have a function of transmitting and receiving information between the portable information terminal and the display device by connecting a signal cable.

Embodiment 5

Though TN liquid crystal is adopted for the liquid crystal panel used in the portable information processing system of the present invention, ferroelectric liquid crystal or thresholdless antiferroelectric liquid crystal may be used. For example, usable liquid crystal includes ones disclosed in: 1998, SID, "Characteristics and Driving Scheme of Polymer-Stabilized Monostable FLCD Exhibiting Fast Response Time and High Contrast Ratio with Gray-Scale Capability" by H. Furue et al.; 1997, SID DIGEST, 841, "A Full-Color Thresholdless Antiferroelectric LCD Exhibiting Wide Viewing Angle with Fast Response Time" by T. Yoshida et al.; 1996, J. Mater. Chem. 6(4), 671–673, "Thresholdless Antiferroelectricity in Liquid Crystals and its Application to Displays" by S. Inui et al.; and U.S. Pat. No. 5,594,569.

Liquid crystal that exhibits antiferroelectric phase in a certain temperature range is called antiferroelectric liquid crystal. Among mixed liquid crystal having antiferroelectric liquid crystal, there is one called thresholdless antiferroelectric mixed liquid crystal, which exhibits electro-optical response characteristics that the transmittance varies continuously with respect to the electric field. Some of the thresholdless antiferroelectric mixed liquid crystal show electrooptical response characteristics of V shape, and there has been found among them ones the driving voltage of which is about ±2.5 V (cell thickness of about 1 $\mu$m to 2 $\mu$m).

Figure 14:
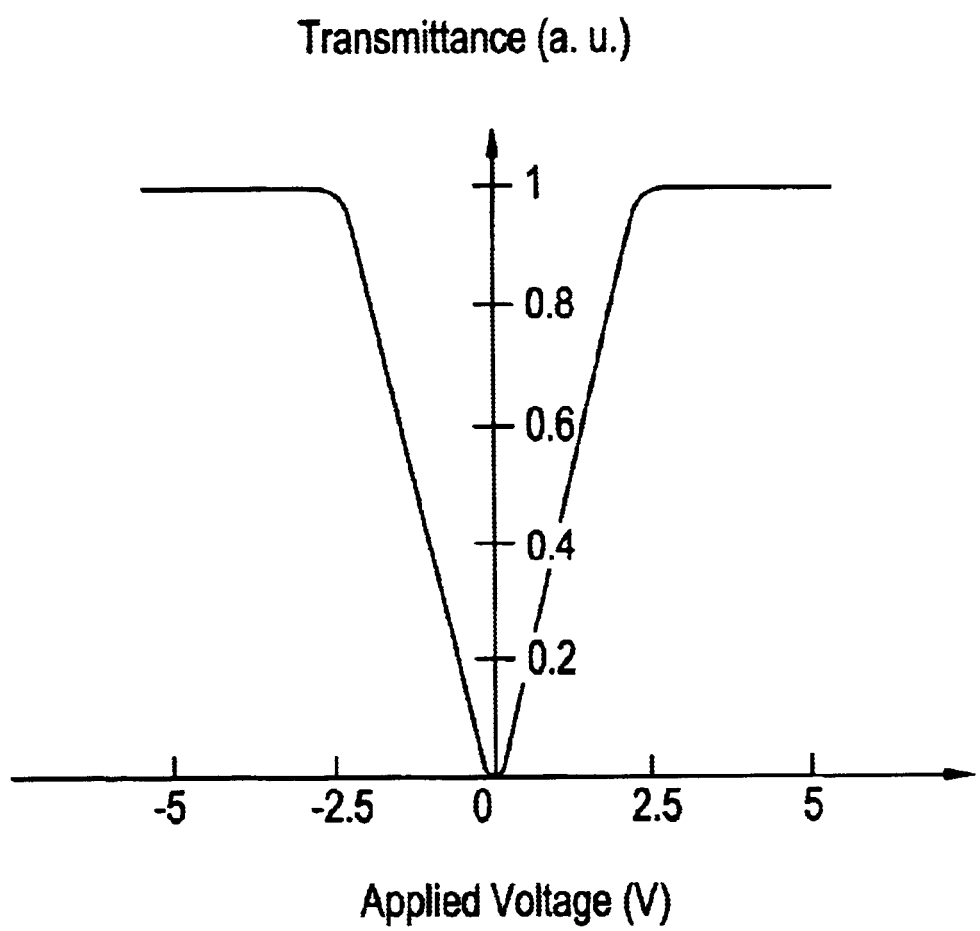
FIG. 14 is a graph showing characteristics in applied voltage-transmittance of thresholdless antiferroelectric mixed liquid crystal.

Here, reference is made to FIG. 14 showing characteristics of the thresholdless antiferroelectric mixed liquid crystal that exhibits electrooptical response characteristics of V shape, in terms of its light transmittance with respect to the applied voltage. In the graph shown in FIG. 14, the axis of ordinate indicates transmittance (arbitrary unit) and the axis of abscissa indicates applied voltage. A transmission axis of a polarizing plate on the incident side of the liquid crystal panel is set substantially in parallel with the normal line direction of a smectic layer of the thresholdless antiferroelectric mixed liquid crystal which substantially coincides with the rubbing direction of the liquid crystal panel. On the other hand, a transmission axis of the polarizing plate on the emission side is set to be substantially perpendicular to the transmission axis of the polarizing plate on the incident side (cross Nicol).

As shown in FIG. 14, it can be understood that using such thresholdless antiferroelectric mixed liquid crystal makes possible the low-voltage driving and gradation display.

In the case that such thresholdless antiferroelectric mixed liquid crystal of low-voltage driving is used for a liquid crystal panel having an analog driver, supply voltage of a sampling circuit for a video signal may be suppressed to, for example, about 5 V to 8 V. Accordingly, operation supply voltage of the driver may be lowered to realize a liquid crystal panel of lowered power consumption and high reliability.

Also in the case that such thresholdless antiferroelectric mixed liquid crystal of low-voltage driving is used for a liquid crystal panel having a digital driver, output voltage of a D/A conversion circuit may be reduced so as to lower operation supply voltage of the D/A conversion circuit and to lower operation supply voltage of the driver. Accordingly, a liquid crystal panel of lowered power consumption and high reliability may be realized.

Therefore, the use of such thresholdless antiferroelectric mixed liquid crystal of low-voltage driving is effective also when employing a TFT having an LDD region (lightly doped domain) of which width is relatively small (for example, 0 nm to 500 nm, or 0 nm to 200 nm).

In general, thresholdless antiferroelectric mixed liquid crystal is large in spontaneous polarization and dielectric permittivity of liquid crystal itself is high. For that reason, relatively large holding capacitance is required for a pixel when the thresholdless antiferroelectric mixed liquid crystal is used for a liquid crystal panel. Thus, preferably used is thresholdless antiferroelectric mixed liquid crystal that is small in spontaneous polarization. Alternatively, with employment of the linear-sequential driving as a driving method of the liquid crystal panel, writing period of gradation voltage into a pixel (pixel feed period) is prolonged so that a small holding capacitance may be supplemented.

The use of such thresholdless antiferroelectric mixed liquid crystal realizes the low-voltage driving, to thereby realize lowered power consumption in a liquid crystal panel.

Incidentally, any liquid crystal may be used as a display medium for the liquid crystal panel of the portable information processing system according to the present invention, on condition that it has electrooptical characteristics as shown in FIG. 14.

According to the portable information processing system of the present invention, an image displayed on the display portion of the portable information terminal is displayed on the HMD (head mount display) worn by a user, and information is transmitted and received between the portable information terminal and the HMD by means of wireless information transmission means such as infrared-ray data communication or communication by radio wave. There presented a portable information processing system of small size and lightweight, thus making it possible to perform high-level information processing even when the user is neither at home nor his/her office.

What is claimed is:

1. A portable information processing system comprising:
   a display device to be worn by a user on the user's head, said display device comprising a liquid crystal panel having a pixel portion, a driver portion and an image sensor portion; and
   a portable information terminal to be used by the user;
   said liquid crystal panel comprising:
   a transparent substrate having at least one pixel;
   a first thin film transistor and a second thin film transistor disposed in said at least one pixel;
   a first interlayer insulating film covering said first and second thin film transistors;
   a photoelectric conversion element formed on said first interlayer insulating film and electrically connected to said first thin film transistor through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;
   a second interlayer insulating film formed over said first interlayer insulating film and said photoelectric conversion element; and
   a transparent pixel electrode formed on said second interlayer insulating film and electrically connected to said second thin film transistor;
   wherein said display device displays an image from said portable information terminal;
   wherein data is sent and received between said display device and said portable information terminal by infrared rays.

2. A portable information processing system according to claim 1 wherein nematic liquid crystal is used for a display medium of said liquid crystal panel.

3. A portable information processing system according to claim 1 wherein thresholdless antiferroelectric mixed liquid crystal having electrooptical characteristics of a V-shape is used for a display medium of said liquid crystal panel.

4. The portable information processing system according to claim 1 wherein said plurality of sensors comprises a plurality of photodiodes.

5. A portable information processing system comprising:
   a display device to be worn by a user on the user's head, said display device comprising a liquid crystal panel having a pixel portion, a driver portion and an image sensor portion; and
   a portable information terminal used by the user;
   said liquid crystal panel comprising;
   a transparent substrate having at least one pixel;
   a first thin film transistor and a second thin film transistor disposed in said at least one pixel;
   a first interlayer insulating film covering said first and second thin film transistors;
   a photoelectric conversion element formed on said first interlayer insulating film and electrically connected to said first thin film transistor through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;
   a second interlayer insulating film formed over said first interlayer insulating film and said photoelectric conversion element; and
   a transparent pixel electrode formed on said second interlayer insulating film and electrically connected to said second thin film transistor;
   wherein said display device displays an image from said portable information terminal;
   wherein data is sent and received between said display device and said portable information terminal by radio wave.

6. A portable information processing system according to claim 5 wherein nematic liquid crystal is used for a display medium of said liquid crystal panel.

7. A portable information processing system according to claim 5 wherein threshholdless antiferroelectric mixed liquid crystal having electrooptical characteristics of a V-shape is used for a display medium of said liquid crystal panel.

8. The portable information processing system according to claim 5 wherein said plurality of sensors comprises a plurality of photodiodes.

9. A portable information processing system comprising:
a display device to be worn by a user on the user's head;
a portable information terminal used by a user;
wherein said display device displays an image from said portable information terminal used by the user;
wherein said display device comprises a liquid crystal panel having a pixel portion, a driver portion and a sensor portion having picture-recognizing means for recognizing pictures of the user's eye; comprising:
a plurality of cells formed on said substrate in a matrix form, each cell comprising:
said pixel portion having at least one pixel TFT over the substrate and said image sensor portion having at least one sensor TFT over the substrate;
a first interlayer insulating film covering said pixel TFT and said sensor TFT;
a photoelectric conversion element formed on said first interlayer insulating film and electrically connected to said sensor TFT through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;
a second interlayer insulating film formed over said first interlayer insulating film and said photoelectric conversion element; and
a transparent pixel electrode formed on said second interlayer insulating film and electrically connected to said pixel TFT;
wherein the recognized pictures of his/her eyes are used to calculate coordinates for the point of the visual of the user; and
wherein data is sent and received between said display device and said portable information terminal by infrared rays.

10. A portable information processing system according to claim 9 wherein said picture-recognizing means is an image sensor.

11. A portable information processing system according to claim 9 wherein said picture-recognizing means is a CCD camera.

12. A portable information processing system according to claim 9 wherein nematic liquid crystal is used for a display medium of said liquid crystal panel.

13. A portable information processing system according to claim 9 wherein thresholdless antiferroelectric mixed liquid crystal having electrooptical characteristics of a V-shape is used for a display medium of said liquid crystal panel.

14. A portable information processing system comprising;
a display device to be worn by a user on the user's head;
a portable information terminal used by the user;
wherein said display device displays an image from said portable information terminal;
wherein said display device comprises a liquid crystal panel having a pixel portion, a driver portion and a sensor portion having picture-recognizing means for recognizing pictures of the user's eye; comprising:
a plurality of cells formed on said substrate in a matrix form, each cell comprising:
said pixel portion having at least one pixel TFT over the substrate and said image sensor portion having at least one sensor TFT over the substrate;
a first interlayer insulating film covering said pixel TFT and said sensor TFT;
a photoelectric conversion element formed on said first interlayer insulating film and electrically connected to said sensor TFT through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;
a second interlayer insulating film formed over said first interlayer insulating film and said photoelectric conversion element; and
a transparent pixel electrode formed on said second interlayer insulating film and electrically connected to said pixel TFT;
wherein the recognized pictures of his/her eyes are used to calculate coordinates for the point of the visual of the user; and
wherein data is sent and received between said display device and said portable information terminal by radio wave.

15. A portable information processing system according to claim 14 wherein said picture-recognizing means is an image sensor.

16. A portable information processing system according to claim 14 wherein said picture-recognizing means is a CCD camera.

17. A portable information processing system according to claim 14 wherein nematic liquid crystal is used for a display medium of said liquid crystal panel.

18. A portable information processing system according to claim 14 wherein thresholdless antiferroelectric mixed liquid crystal having electrooptical characteristics of a V-shape is used for a display medium of said liquid crystal panel.

19. A portable information processing system comprising:
a display device having a liquid crystal panel, said display device to be worn by a user on the user's head;
a portable information terminal used by the user, said portable information terminal providing information to said display device by infrared ray; and
an image sensor in said liquid crystal panel, said image sensor recognizing pictures of the user's eyes and calculating coordinates for the point of the visual of the user, said liquid crystal panel comprising;
a transparent substrate having at least one pixel;
a first thin film transistor and a second thin film transistor disposed in said at least one pixel;
a first interlayer insulating film covering said first and second thin film transistor transistors;
a photoelectric conversion element formed on said first interlayer insulating film and electrically connected to said first thin film transistor through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;

a second interlayer insulating film formed over said first interlayer insulating film and said photoelectric conversion element; and a transparent pixel electrode formed on said second interlayer insulating film and electrically connected to said second thin film transistor;

a portable information terminal used by the user, said portable information terminal providing information to said display device by infrared ray; and an image sensor in said liquid crystal panel, said image sensor recognizing pictures of the user's eyes and calculating coordinates for the point of the visual of the user.

20. A portable information processing system according to claim 19 wherein said image sensor comprises a photodiode.

21. A portable information processing system according to claim 20 wherein nematic liquid crystal is used for a display medium of said liquid crystal panel.

22. A portable information processing system according to claim 20 wherein thresholdless antiferroelectric mixed liquid crystal having electrooptical characteristics of a V-shape is used for a display medium of said liquid crystal panel.

23. A portable information processing system comprising:
a display device having a liquid crystal panel, said display device to be worn by a user on the user's head;

a portable information terminal used by the user, said portable information terminal providing information to said display device by radio wave; and an image sensor in said liquid crystal panel, said image sensor recognizing pictures of the user's eyes and calculating coordinates for the point of the visual of the user, said liquid crystal panel comprising:

a transparent substrate having at least one pixel;

a first thin film transistor and a second thin film transistor disposed in said at least one pixel;

a first interlayer insulating film covering said first and second thin film transistors;

a photoelectric conversion element formed on said first interlayer insulating film and electrically connected to said first thin film transistor through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;

a second interlayer insulating film formed over said first interlayer insulating film and said photoelectric conversion element; and a transparent pixel electrode formed on said second interlayer insulating film and electrically connected to said second thin film transistor;

a portable information terminal used by the user, said portable information terminal providing information to said display device by infrared ray; and an image sensor in said liquid crystal panel, said image sensor recognizing pictures of the user's eyes and calculating coordinates for the point of the visual of the user.

24. A portable information processing system according to claim 23, wherein said image sensor comprises a photodiode.

25. A portable information processing system according to claim 24, wherein nematic liquid crystal is used for a display medium of said liquid crystal panel.

26. A portable information processing system according to claim 24 wherein thresholdless antiferroelectric mixed liquid crystal having electrooptical characteristics of a V-shape is used for a display medium of said liquid crystal panel.

27. A portable information processing system comprising:
a display device to be worn by a user on the user's head;

a portable information terminal to be used by the user;

wherein said display device displays an image from said portable information terminal;

wherein data is sent and received between said display device and said portable information terminal by infrared rays, and wherein said display device comprises a liquid crystal panel having a pixel portion, a driver portion and an image sensor portion on a substrate, comprising;

a plurality of cells formed on said substrate in a matrix form, each cell comprising said pixel portion having at least one pixel TFT over the substrate and said image sensor portion having at least one sensor TFT over the substrate;

a first interlayer insulating film covering said pixel TFT and said sensor TFT;

a photoelectric conversion element formed on said first interlayer insulating film and electrically connected to said sensor TFT through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;

a second interlayer insulating film formed over said first interlayer insulating film and said photoelectric conversion element; and a transparent pixel electrode formed on said second interlayer insulating film and electrically connected to said pixel TFT.

28. A portable information processing system comprising:
a display device to be worn by a user on the user's head;

a portable information terminal used by the user;

wherein said display device displays an image from said portable information terminal;

wherein data is sent and received between said display device and said portable information terminal by radio wave, and wherein said display device comprises a liquid crystal panel having a pixel portion, a driver portion and an image sensor portion on a substrate, comprising;

a plurality of cells formed on said substrate in a matrix form, each cell comprising said pixel portion having at least one pixel TFT over the substrate and said image sensor portion having at least one sensor TFT over the substrate;

a first interlayer film covering said pixel TFT and said sensor TFT;

a photoelectric conversion element formed on said first interlayer insulating film and electrically connected to said sensor TFT through said first interlayer insulating film wherein said photoelectric conversion element comprises a first electrode formed on said first interlayer insulating film, a photosensitive semiconductor film formed on the first electrode, and a transparent second electrode formed on the photosensitive semiconductor film;

a second interlayer insulating film formed over said first interlayer insulating film and said photoelectric conversion element; and a transparent pixel electrode formed on said second interlayer insulating film and electrically connected to said pixel TFT.

* * * * *